United States Patent [19]

McBriar et al.

[11] 3,959,188

[45] May 25, 1976

[54] SURFACTANTS AND THEIR USE IN FOAMABLE POLYMER COMPOSITIONS

[75] Inventors: David John McBriar; Harry Charles Murfitt, both of Stockton-on-Tees, England; Robert Edward Bohun, Melbourne, Australia

[73] Assignee: Imperial Chemical Industries Limited, London, England

[22] Filed: July 19, 1974

[21] Appl. No.: 490,191

[30] Foreign Application Priority Data

July 19, 1973 United Kingdom............... 34469/73

[52] U.S. Cl............................ 260/2.5 P; 260/30.6 R; 260/31.8 R; 260/33.8 UA; 260/42.41; 260/891
[51] Int. Cl.² ........................................... C08J 9/30
[58] Field of Search...................... 260/2.5 P, 2.5 R

[56] References Cited

UNITED STATES PATENTS

| | | | |
|---|---|---|---|
| 3,558,533 | 1/1971 | Feit .................................. | 260/2.5 P |
| 3,639,297 | 2/1972 | Steffen et al. ..................... | 260/2.5 P |
| 3,703,485 | 11/1972 | Fischer ............................. | 260/2.5 P |
| 3,770,670 | 11/1973 | Kuhlow et al. ................... | 260/2.5 P |
| 3,796,675 | 3/1974 | Fischer ............................. | 260/2.5 P |

*Primary Examiner*—Morton Foelak
*Attorney, Agent, or Firm*—Cushman, Darby & Cushman

[57] ABSTRACT

A foamable composition comprises polyvinyl chloride or copolymer thereof, a nonionic surfactant and an organic acid salt of a mono- or dialkanolamine.

7 Claims, No Drawings

SURFACTANTS AND THEIR USE IN FOAMABLE POLYMER COMPOSITIONS

The present invention relates to surfactant formulations and to their use in foamable vinyl polymer compositions.

Polyvinylchloride and copolymers of vinyl chloride with other monomers such as vinyl acetate may be converted into forms by mechanical agitation in the presence of a surfactant. The foam may then be cured by heating to give a stable cellular structure which has good cushioning and insulating properties. The surfactant which is used has an important influence on the structure of the foam and on its stability, anionic surfactants giving in general a stable foam of coarse structure and nonionic surfactants a finer but less stable foam. If an anionic surfactant is used together with a nonionic surfactant then the better properties of each may be shown and a fine and stable foam obtained. The present invention uses a combination of an anionic and a nonionic surfactant but, by choice from a limited group of anionic surfactants, it enables foams of outstanding properties to be produced.

According to the invention a foamable composition comprises a homo or copolymer of vinylchloride, a nonionic surfactant and an organic acid salt of a mono- or dialkanolamine.

The organic acid salt of the mono- or dialkanolamine is an anionic surfactant. The alkanolamine is preferably derived from a $C_2$ to $C_6$ alkanol and is more preferably mono- or diethanolamine, particularly the former.

The alkanolamine salt may be a carboxylate, an organo-sulphate, an organo-sulphonate or an organophosphate and suitably contains at least one carbon chain of 7 to 22 carbon atoms. The carbon chain may be aliphatic, e.g. as in a $C_{10}$ to $C_{14}$ fatty acid such as lauric acid or in an alcohol ether sulphate made by sulphating an alcohol containing 10 to 14 carbon atoms, which has previously been reacted with one ethylene oxide unit per molecule. The carbon chain may also form part of an alkyl benzene group, e.g. as in an alkyl benzene sulphonate in which each alkyl group may contain 1 to 20 carbon atoms, particularly 10 to 14 carbon atoms such as a p-dodecyl benzene sulphonate. Instead of a 7 to 22 carbon atom chain a chain or propylene or higher alkylene oxide units may be present, preferably comprising 7 to 22 such units, particularly 10 to 14.

The nonionic surfactant is suitably an alkoxylate, preferably an alkoxylate derived from one or more $C_1$ to $C_4$ alkylene oxides, more preferably an ethoxylate, of an alkylphenol, an alcohol, a fatty acid amide or an amine. The alkoxylate suitably comprises 5 to 20, preferably 10 to 17, more preferably 13 to 15, repeating alkylene oxide units. The alcohol, amide or amine are preferably saturated aliphatic compounds with a carbon chain length of 5 to 20, preferably 7 to 17, more preferably 12 to 14 carbon atoms. An alkylphenol alkoxylate which comprises one or more alkyl groups containing 5 to 15, preferably 7 to 12 carbon atoms, is particularly suitable for use in the composition according to the invention, e.g. a p-octyl or p-nonylphenol ethoxylate containing 13 to 15 ethylene oxide units.

The composition according to the invention may contain polyvinylchloride (PVC) or a copolymer of vinyl chloride with a monomer such as vinyl acetate, acrylonitrile, vinylidene chloride or a similar suitable monomer known in the plastics industry. As the PVC compositions used in the production of foams almost invariably contain a plasticiser (such compositions being known as 'Plastisols' or 'PVC-pastes'), the compositions in accordance with the present invention also preferably contain a plasticiser. Any of the well known plasticisers may be used including chlorinated paraffins and polymeric plasticisers such plasticisers a butadiene/acrylonitrile copolymer. The most suitable plasticisers, however, are various esters, e.g. esters of inorganic acids such as tricresyl phosphate and particularly esters of orthophtholic acid, sebacic acid or adipic acid with benzyl alcohol or with a $C_4$ to $C_{14}$ alkanol or mixture of alkanols, e.g. di-iso-octyl phthalate, di(2-ethylhexyl) phthalate, butyl benzyl phthalate or the diester of orthophthalic acid with the mixture of $C_7$ to $C_9$ alkanols sold under the trademark 'ALPHANOL'.

Compositions in accordance with the invention may also include other additives which are commonly contained in PVC compositions, e.g. dyes, fillers, stabilisers etc.

The compositions of the invention suitably comprise up to 20% by weight total surfactant, preferably 0.5 to 10% by weight. The anionic to nonionic surfactant ratio is preferably in the range 1 : 5 to 5 : 1 and the composition may contain 20 to 60% by weight of plasticiser.

The compositions of the invention may be blended by conventional mixing means, e.g. by stirring and the foaming of the composition is also suitably carried out using apparatus and methods recognised for this purpose. Finally the 'wet' foam may be cured by heating to a temperature in the range 100° to 200°C.

The invention will now be further described with reference to the Examples.

EXAMPLE 1

150 grams of dodecylbenzene sulphonic acid were mixed with 20 grams of the diester of ortho phthalic acid with a mixture of $C_7$ to $C_9$ alcohols sold under the trademark ALPHANOL. The mixture was placed in a beaker in an ice bath in a fume cupboard and neutralised by the addition with stirring of approximately 30 grams of monoethanolamine to a pH of 8 to 10 as shown on a universal indicator paper.

After the neutralisation 100 grams of a p-nonylphenol/ethylene oxide condensate containing an average of 13 ethylene oxide units was stirred into the neutralised product when a clear viscous liquid was obtained.

140 grams (70 parts) XP60/68 (a copolymer of vinylchloride and vinyl acetate), 60 grams (30 parts) D55/3 (polyvinyl chloride) and 100 grams (50 parts) of a limestone filler were placed in the bowl of a Hobart Planetary Mixer model CE100 and 200 grams of a mixture of plasticiser consisting of butyl benzyl phthalate (30 parts), 'CERECLOR' 545 (a chlorinated paraffin) (20 parts) and the diester of ortho phthalic acid and the alcohols sold under the trademark ALPHANOL (50 parts) added in two portions, the mixture being stirred between additions. The stirring was for a period of 3 minutes followed by a period of 2 minutes when the surfactant mixture (4 parts) was added and the composition stirred for a further 20 minutes.

The foam which was obtained had a wet foam density of 0.49 gram/cc. After curing by heating at 140°C for 7 minutes the foam density was 0.48 gram/cc. CERE- CLOR is a registered trademark.

EXAMPLE 2

A formulation was made up in a planetary mixer to the same relative proportion of the same ingredients as in Example 1. 25 kilograms were prepared and were then pumped into a Euromatic foaming machine. The foams produced had a fine cell structure and a smooth surface finish. The wet density was 0.28 gram/cc and the cured density after heating at 128°C for 4 minutes also 0.28 gram/cc.

EXAMPLE 3

150 grams of dodecylbenzene sulphonic acid were mixed with 20 grams of the diester of ortho-phthalic acid with a mixture of $C_7$ to $C_9$ alcohols sold under the trademark ALPHANOL. This mixture was placed in a beaker in an ice bath in a fume cupboard and neutralised by the addition with stirring of approximately 37 grams of mono-n-propanolamine to a pH of 8 to 10 as shown on a universal indicator paper.

A formulation containing the propanolamine derivative was made up with the same components in the same proportions as described in Example 2 and was tested by the same method. The wet density of the foam produced was 0.30 gram/cc and the cured density also 0.30 gram/cc.

EXAMPLE 4

Example 2 was repeated except that the formulation contained 160 grams limestone filler. The foam which was obtained had a wet density of 0.34 gram/cc and a cured density of 0.35 gram/cc.

We claim:

1. A foamable composition which comprises a homo- or co-polymer of vinylchloride, an ethoxylate containing 5 to 20 ethylene oxide units of an alkylphenol comprising one or more alkyl groups containing 5 to 15 carbon atoms and a salt of a mono- or di-alkanolamine derived from a $C_2$ to $C_6$ alkanol and an alkylbenzene sulfonic acid in which the alkyl group contains 10 to 14 carbon atoms.

2. The foamable composition of claim 1, wherein the total amount of ethoxylate and salt of the mono- or dialkanolamine is up to 20% of the composition.

3. The composition of claim 1, wherein the ratio of the ethoxylate to the salt can range from 1:5 to 5:1.

4. The foamable composition of claim 1, which consists essentially of a homo- or co-polymer of vinylchloride, an ethoxylate containing 5 to 20 ethylene oxide units of an alkylphenol comprising one or more alkyl groups containing 5 to 15 carbon atoms and a salt of a mono- or di-alkanolamine derived from a $C_2$ to $C_6$ alkanol and an alkylbenzene sulfonic acid in which the alkyl group contains 10 to 14 carbon atoms.

5. The composition of claim 1, in which the ethoxylate contains 10 to 17 ethylene oxide units.

6. The composition of claim 1, in which the ethoxylate is derived from an alkylphenol in which the alkyl group contains 7 to 12 carbon atoms.

7. The composition of claim 1, in which said salt is a salt of p-dodecylbenzene sulphonic acid.

* * * * *